Aug. 22, 1967

P. A. MEDICKS ETAL 3,336,816

INDEXING MECHANISM

Filed July 1, 1965

INVENTORS
PETER A. MEDICKS
EARL E. SCHWARZENBACH
BY Harold W. Adams
their
attorney Aug. 22, 1967   P. A. MEDICKS ETAL   3,336,816
INDEXING MECHANISM Filed July 1, 1965   3 Sheets-Sheet 3

INVENTORS
PETER A. MEDICKS
EARL E. SCHWARZENBACH
BY Harold W. Adams
their Attorney

3,336,816
INDEXING MECHANISM
Peter Anthony Medicks and Earl Edward Schwarzenbach, Smithfield, N.C., assignors to Shallcross Manufacturing Company, Selma, N.C.
Filed July 1, 1965, Ser. No. 468,902
10 Claims. (Cl. 74—527)

ABSTRACT OF THE DISCLOSURE

Ball detent type of rotary shaft indexing mechanism having a ball engaging detent spring mounted for free rotation on the shaft while being secured against axial movement thereon to enhance the rolling action of the balls on a position defining cam track.

---

This invention relates to an indexing mechanism and more particularly to a detent indexing mechanism for rotary switches and the like.

Indexing mechanisms such as rotary switches employing ball detents with a detent plate having a plurality of projections on the surface thereof to provide an indexing operation between adjacent projections on the detent plate are conventional and well known. In conventional rotary switches of this type, a detent plate cooperates with ball detents supported by a cage ring. The ball detents are forced into engagement with a cam track on the detent plate by means of a fixed spring, either riveted to the cage ring or affixed to the shaft, for rotation therewith. The shaft may also carry an insulated rotor, having a wiper or wipers thereon that indexes with the ball detent to engage radially spaced contacts on a fixed contact plate to which electrical circuits are connected. Manual switches of this type are sometimes referred to as clicking devices.

Conventionally, several contact switch decks may be mounted on a single shaft and the torque requirement for indexing the switch increases correspondingly. The torque of rotary indexing switches is defined as the torque required to turn the shaft of the switch and comprises the sum of the torque to turn the contact decks secured to the shaft plus the maximum input torque required to operate the detent and move the ball detent between adjacent detent positions. The output torque of a manual rotary indexing switch of this type is that torque required to rotate the contact decks and return the ball detents to the exact detent position in the event an operator fails to turn the ball detent exactly to the next detent position during a switching operation.

For reliability of operation a minimum contact pressure must be maintained between the wiper or wipers and the contact plate to insure low electrical resistance. As the circuitry with which these types of rotary indexing switches are employed becomes more complex, requiring more wipers and contact plates, there is a corresponding increase in the friction. This in turn requires a greater torque to turn the switch to insure positive indexing action and also requires a greater output torque to assure exact seating of the ball detents in the detent position.

Thus to provide more positive indexing with increased number of wipers and contact plates it is necessary to increase the output torque of the detent or indexing mechanism. This can be done in the conventional fixed spring rotary indexing switch by varying the size of the fixed spring or by adding additional springs. However, increasing the output torque in this fashion also increases the input torque requirements in proportion, which in turn requires a larger knob to turn the switch. This has disadvantages in that considerations of appearance and space available limit and dictate the size of the shaft turning knob. When a small knob must be used the switch may be difficult or impossible to turn.

In analyzing the operation of conventional manual rotary indexing switches employing a fixed spring it has been determined that there is a high operating friction between the ball detent and the fixed spring and detent projections. It has further been discovered that this high operating friction limits ball roll and leads to excessive wearing of the ball detent, the fixed spring and the detent projections, thus reducing the operating life of the switch. Further, as the same portion of the fixed spring is repeatedly subjected to tension and frictional forces during switch operation there is a greater torque loss during the life operation of the switch. Also, as the fixed spring must generally be preformed to assure a minimum pressure and positive indexing action, the operating characteristics of conventional switches are determined and limited by the choice of spring material.

In addition to the design criteria and limits of the choice of spring, the fixed spring rotary indexing switch is expensive to manufacture because of the additional parts needed. For instance, rivets or other fasteners are required to secure the fixed and formed spring to the ball cage ring or to the shaft. Also, in the event it is necessary to change the torque requirements for an assembled switch or to replace worn or defective springs or other parts, substantially the entire switch must be disassembled and both the cage ring and fixed spring replaced or the rivets or other fasteners connecting the spring and the cage ring removed.

Thus it is an object of this invention to provide an indexing mechanism that overcomes the disadvantages of conventional fixed spring indexing mechanisms.

A further object of this invention is to provide an indexing mechanism for a rotary switch that provides greater output torque for positive detent positioning without increasing the input torque of the switch.

Yet another object of this invention is to provide an indexing mechanism for a rotary switch including a rotating spring for reducing the operating friction in a ball detent and for permitting free ball roll during switching operation.

Still another object of this invention is to provide an indexing mechanism for a rotary indexing switch, having easier assembly, repair and replacement of parts in the rotary switch.

These and many other objects and advantages are achieved by an indexing mechanism in a rotary switch in accordance with the principles of this invention, which in general may comprise a rotary shaft extending through a detent plate having a cam track such as a plurality of radially spaced detent projections extending from the surface, a bar or cage ring having one or more apertures therein for receiving ball detents is spaced from the detent plate such that the ball detents are confined by the cage bar or ring and rest between the detent projections forming the cam track on the detent plate. A flat spring fixedly secured to the shaft to prevent axial movement along the shaft and permit free rotation thereof around the shaft is spaced from the cage bar or ring and in engagement with the ball detents projecting through the apertures in the cage bar or ring and confine them therein. An insulated rotor carrying a wiper or contact members is secured to the shaft for rotation therewith and spaced from a contact plate provided with a plurality of radially spaced contacts fixedly secured to the stationary detent plate by means of posts. Each rotor and contact plate is spaced so that a determined minimum of contact resistance is maintained between the wiper and the respective contacts so that as the shaft is turned and the ball detents advance from one detent position to the next the wiper or wipers advance in seriation over the contacts of the contact plate. The cam track on the detent plate may be formed by means of radially spaced detent projections or holes formed on or in the detent plate, and the detent plate may be fixed and the cage ring secured for rotation with the shaft or vice versa.

Although the principle of the indexing mechanism of this invention has been described in conjunction with rotary switches, either single or multiple decks, the principle of the invention, the rotating detent spring, may be employed in all types of mechanical devices requiring indexing or positioning, including rotary switches, attenuators, instruments and other applications.

Further objects and advantages of the invention will become apparent from the following detailed description of a preferred embodiment of the invention when read in view of the appended drawings wherein.

Figure 1:
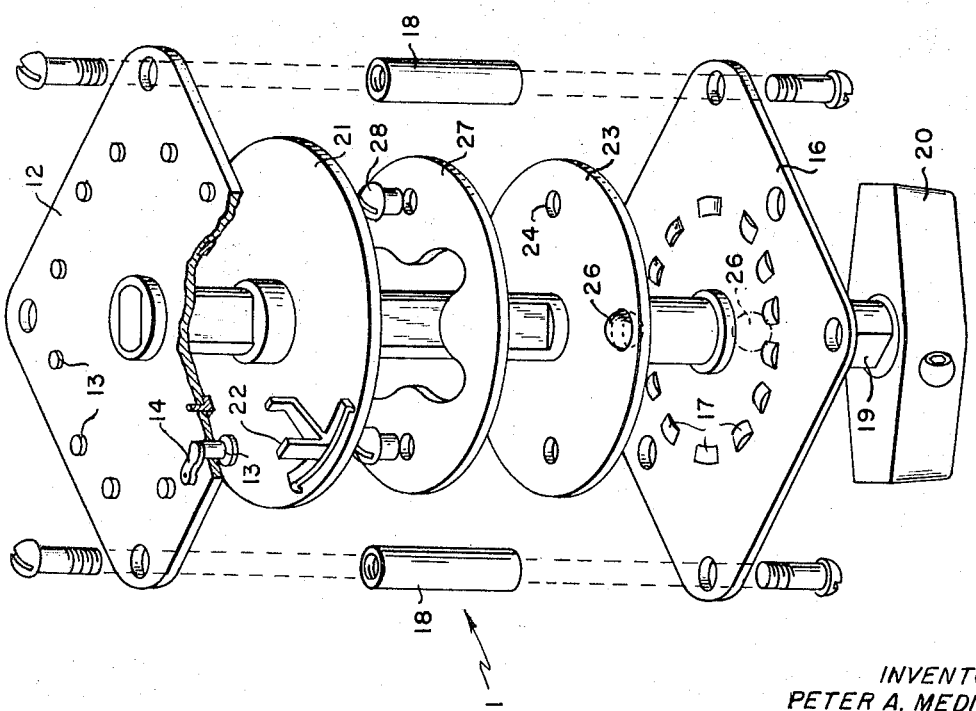
FIGURE 1 is an exploded perspective view of a conventional rotary indexing switch including a fixed detent spring.

Referring now to the drawings, FIGURE 1 illustrates a conventional rotary indexing switch designated generally by the reference numeral 11. The switch 11 includes a fixedly mounted contact plate 12 carrying a plurality of radially spaced contacts 13 to which a plurality of electrical circuits 14 may be connected. The contact plate 12 is secured to a detent plate 16 having a plurality of radially spaced detent projections 17 formed on the face thereof by means of posts 18. A shaft 19, provided with a turning knob 20, is rotatably received within the detent plate 16 and switch plate 12 and carries an insulated rotor 21 fixedly secured to the shaft and spaced from the contact plate 12 whereby a wiper 22 on the rotor 21 is stepped in seriations to the respective contacts 13 when the shaft 19 is rotated.

Figure 3:
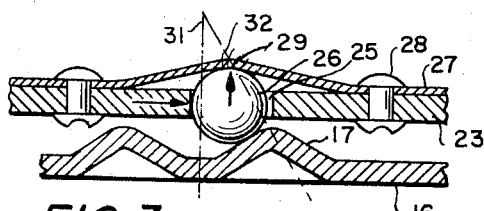
FIGURES 3 and 4 are sectional views illustrating the operation of the indexing mechanism of the fixed spring rotary switch shown in FIGURE 1.
Figure 4:
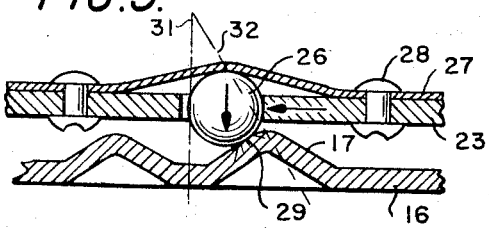

In order to provide an indexing operation the rotary switch 11 is provided with a cage ring 23 secured for rotation with the shaft 19 and provided with diametrically disposed apertures 25 which receive ball detents 26. The cage ring 23 is spaced from the detent plate 16 so that the ball detents 26 normally rest between adjacent detent projections 17 and the wiper 22 always engages one of the radially spaced contacts 13. A spring 27 secured to the cage ring 23 by means of rivets 28 forces the ball detent into engagement with the detent projections to hold the shaft at a fixed position determined by the projections 17, and whereby the ball detents are forced upwardly to flex the fixed spring when the shaft is rotated as shown in FIGURES 3 and 4.

As the spring 27 is fixed it is slightly formed at the points of stress where the diametrically disposed ball detents 26 flex the spring. It can be seen that the same portions of the fixed spring 27 are repeatedly flexed during switch operation. As shown in FIGURE 3, when the shaft 19 is rotated clockwise the fixed spring 27, although flexed, rotates with the cage ring and ball detents and the resulting friction between the ball detents 26 and fixed spring 27 and detent projections 17 limits ball detent roll causing wear of the respective components and high torque drop during the life of the switch 11. FIGURE 4 illustrates the operation of the ball detent indexing mechanism in a conventional switch 11, when insufficient torque is applied to the shaft 19 to turn the ball detent 26 to the next detent position, and the fixed spring 27 returns the ball detent to the starting position. It can be seen by the reference numerals 29, representing frictional engagement between the ball 26 and the spring 27 and detent projection 17, that ball roll is substantially limited.

As has been stated, the torque of a rotary indexing switch is the maximum torque required to turn the shaft and advance the wiper 22 over the contacts 13. The torque of the switch is the sum of the torque required to turn the wiper 22 sliding over the contacts 13 plus the input torque (the maximum input torque required to turn the ball detent mechanism). The output torque is defined as the torque produced by the detent mechanism to return the ball detent 26 (FIGURE 4) to a detent position and must be sufficient to overcome the sliding friction between the wiper 22 and the contacts 13 and positively return the ball to the exact position. This action must be positive for proper switch operation.

Figure 7:
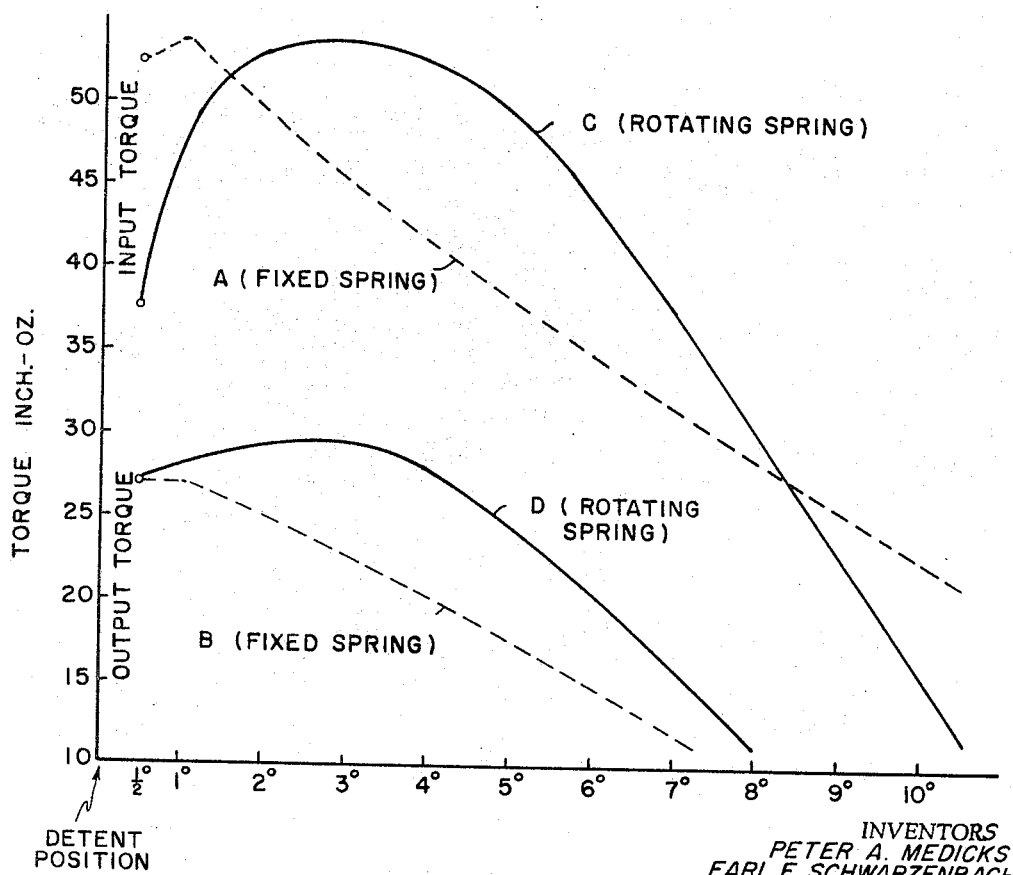
FIGURE 7 is a wave diagram illustrating the input and output torque characteristics of both the fixed spring and rotating spring indexing mechanism for the rotary indexing switches shown in FIGURES 1 and 2 respectively.

In order to illustrate the improved operation of this invention, operating torque measurements (input and output torque) were made for a conventional, single fixed spring indexing mechanism and a single rotary spring indexing mechanism, both switches being identical except for the use of a fixed spring and a rotary spring. In the efficiency tests identical 22°30′ detent plates were used—requiring angular movement of the ball of 11°15′ from the detent position to the crown or top of an adjacent detent projection. Curves A and B, FIGURE 7, illustrate the input torque and output torque of a fixed spring detent mechanism in a conventional rotary switch as shown in FIGURE 1, when operated between the detent position (when the ball detent is exactly positioned between adjacent detent projections as indicated by the vertical reference line 31 in FIGURES 3 and 4) and when turned approximately 11°15′ to the reference line 32 when the ball reaches the top of the detent projection 17.

Where multiple rotors 21 and contact plates 12 are employed with a single detent mechanism the output torque requirements become correspondingly greater. As shown in curve B of FIGURE 7, the output torque of the conventional fixed spring indexing mechanism 11 (shown in FIGURE 1) reaches a maximum at approximately 1° and thereafter decreases rapidly.

Although the output torque of conventional fixed spring rotary indexing switches can be increased by adding springs 27 or using a stronger spring, this leads to a resulting increase in input torque and the turning force required to operate the switch. In multiple deck switches and the normally limited available space such switches become difficult, if not impossible, to turn. In addition, conventional fixed spring indexing switches are difficult to replace or exchange—requiring the spring and cage ring to be disassembled.

Figure 2:
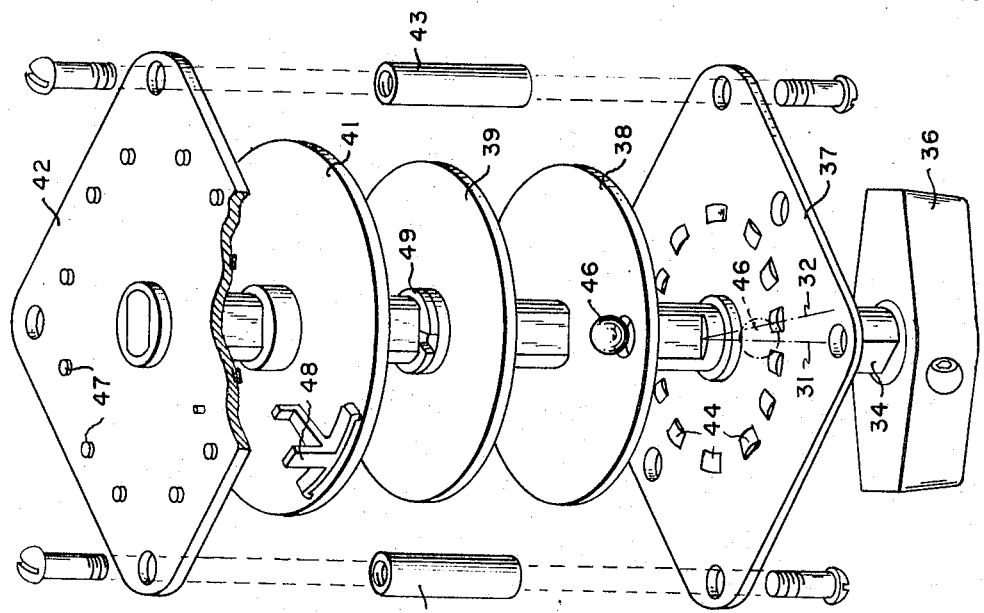
FIGURE 2 is an exploded perspective view of a preferred embodiment of the invention illustrating a rotary indexing switch including a rotating detent spring in accordance with the principles of this invention.

FIGURE 2 illustrates a rotating spring indexing mechanism for a rotary switch, designated generally by the reference numeral 33, in accordance with the principles of this invention that overcomes the disadvantages of conventional detent mechanisms. The switch 33 is similar to the switch 11 and includes a rotary spindle or shaft 34 provided with a turning knob 36 and that extends through a detent plate 37, cage ring 38, a flat spring 39, a rotor 41, and contact plate 42 rigidly secured to the detent plate 37 by means of posts 43. The detent plate 37 is provided with a cam track formed of a plurality of radially spaced detent projections 44 in which diametrically disposed ball detents 46, carried by the cage ring 38, are received. As in the switch 11, contacts 47 on the contact plate 42 and detent projections 44 are positioned so that a wiper 48 carried by the rotor 41 engages a contact 47 when the ball detents 46 are positioned and properly seated on the cam track between adjacent detent projections. The flat spring 39 is freely supported on the shaft for independent rotation and fixed against axial movement on the shaft 34 by means of a snap type C ring 49 received in a groove formed in the shaft. If desired a removable collar may be mounted on the shaft by means of a set screw or the like, for preventing axial movement of the rotary spring 39.

Figure 5:
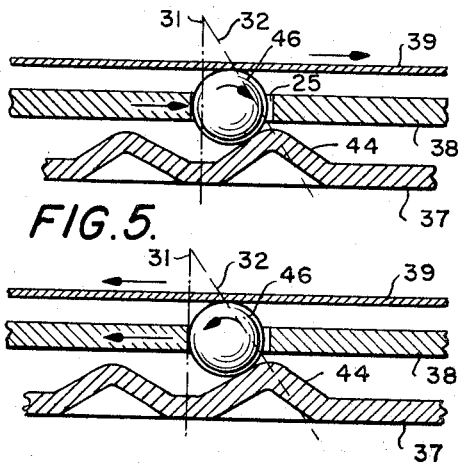
FIGURES 5 and 6 are sectional views illustrating the principles of a rotating spring indexing mechanism in a rotary switch in accordance with the principles of this invention and as illustrated in FIGURE 2.
Figure 6:
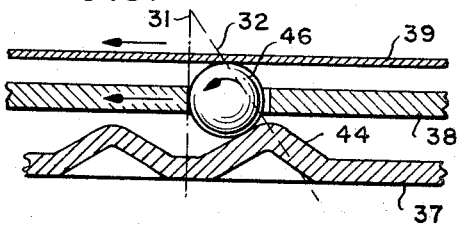

The operation of the invention is illustrated in FIGURES 5 and 6, a sectional view of the detent mechanism of FIGURE 2. As shown when the shaft 34 is turned as in a switching operation (FIGURE 5), the cage ring 38, affixed to the shaft, carries the ball detents 46 against the detent projections 44 forcing the ball detents to roll upwardly against the flat spring 39. As the spring 39 is independent of the cage ring and shaft, it is free to rotate about the shaft. The ball detents are free to roll on the detent projections forming the cam track and this free ball roll action reduces operating friction and greatly reduces ball, spring and detent plate wear and extends the operating life of the switch. Curve C in FIGURE 7 illustrates the input torque of the indexing mechanism of FIGURE 5 as the ball detents 46 are moved from the detent position designated by the vertical reference line 31 through 11° 15′ to the top of the detent projection (reference line 32) while curve D illustrates the output torque for the same indexing mechanism (FIGURE 6).

As clearly shown by curve D (FIGURE 7) the output torque of the switch 33 is greatly increased throughout a greater angle of movement by using the rotary spring 39. This increase in output torque is achieved without increasing the input torque (curve C)—the maximum torque required to operate the indexing mechanism. This greater output torque provides more positive detent positioning with free ball roll and less operating friction, as shown in FIGURE 6.

Figure 8:
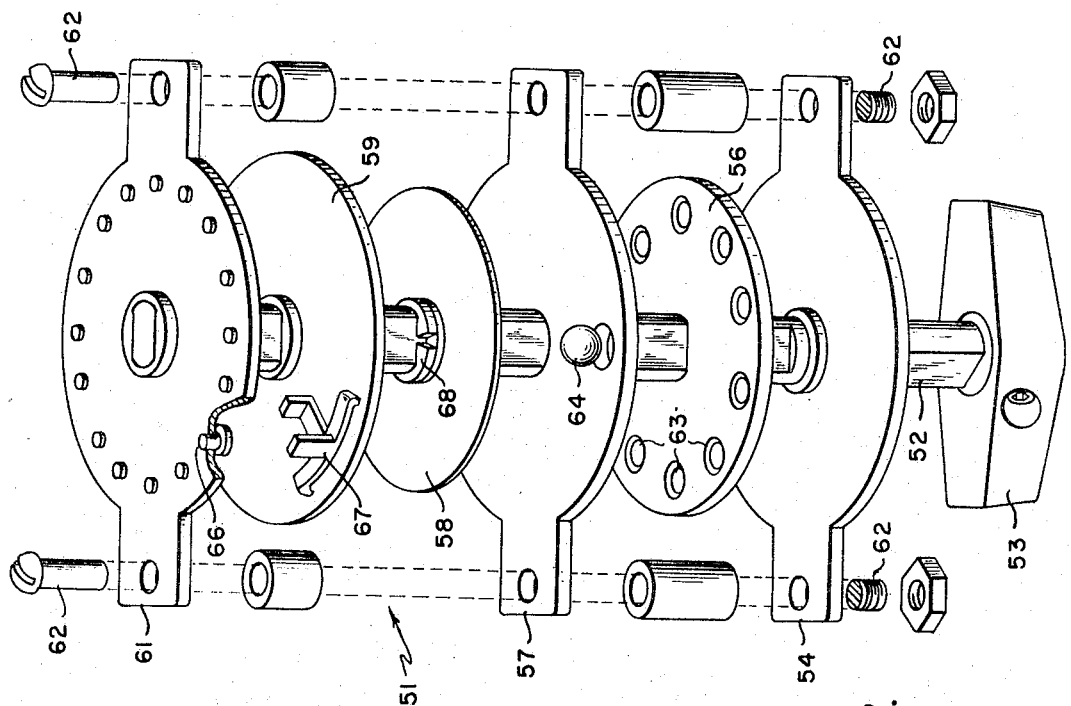
FIGURE 8 illustrates another embodiment of the invention wherein the cam track on the detent plate is formed by coined, radially spaced holes in the detent plate and the detent plate rotates with the shaft and the cage ring is fixed.

Referring now to FIGURE 8 an alternative embodiment of the invention is illustrated and designated generally by the reference numeral 51. The switch 51 includes a rotary spindle or shaft 52 provided with a turning knob 53, and that extends through a mounting plate 54, detent plate 56, cage ring 57, rotating spring 58, rotor 59, and contact plate 61 rigidly secured to the cage ring 57, and mounting plate 54 by means of posts 62. The detent plate 56 is rigidly secured to the shaft 52 for rotation therewith and is provided with a plurality of radially spaced and coined holes 63 which form a circular cam track around the detent plate. The coined holes 63 are smaller and receive diametrically disposed ball detents 64 confined by the fixed cage ring 57. Contacts 66 on the contact plate 61 and holes 63 are positioned so that a wiper 67 carried by the rotor 59 engages a contact 66 when the ball detents 64 are positioned and properly seated in the holes 63 forming the cam track. The flat spring 58 is freely supported on the shaft 52 for independent rotation and fixed against axial movement on the shaft 52 by means of a suitable fastener such as a snap type C ring fastener 68 received in a groove formed in the shaft.

Figure 9:
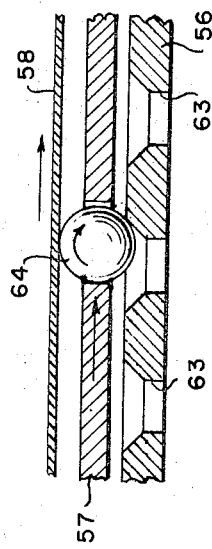
FIGURES 9 and 10 are partial sectional views illustrating the principles of the rotating spring indexing mechanism shown in FIGURE 8.
Figure 10:
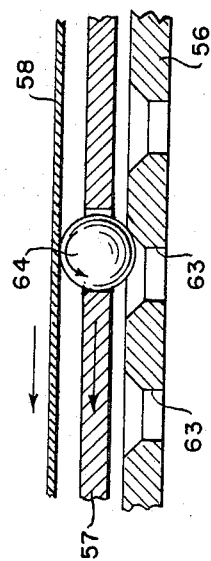

The operation of the indexing mechanism of switch 51 is illustrated in FIGURES 9 and 10. FIGURE 9 shows the ball detent 64 partially seated in one of the coined holes 63 forming the cam track and being advanced to the next adjacent hole 63. As shown the spring 58 is free to rotate with ball detent 64 during the indexing operation, over the resulting shoulders or crowns formed by the coined and radially spaced holes 63. FIGURE 10 illustrates the return of the ball detent 64 to the starting position. The input and output torques of the switch are also illustrated by the curves C and D of FIGURE 7 and indicate the improved operation of the indexing mechanism as shown in FIGURES 8, 9 and 10. As in the switch 33, the output torque of the switch 51 is greatly increased without a corresponding increase in the input torque utilizing the rotating spring 58. The radially spaced and coined holes 63 are easily formed in the detent plate and may be precisely located to form a precision cam track having a variable number of index positions.

In addition to providing a greater output torque without increasing the input torque requirements, the use of the rotary spring 39 and 58 as contrasted with the use of a fixed spring 27 requires fewer components for the indexing mechanism, and is easier to assembly at less cost. When employed in rotary switches, switch life is greatly extended with low torque drop and positive indexing action. Further, repair of the switch and replacement of springs, cage rings and detent plates is more easily accomplished.

Although preferred embodiments of the invention have been described in detail, numerous changes and modifications may be made within the principles of the invention which is to be limited only by the appended claims.

What is claimed is:

1. An indexing mechanism comprising: a plate having a cam track providing a plurality of detent positions; a cage ring having at least one aperture therein spaced from said detent plate; a ball detent received within said aperture and normally resting in a detent position on said plate; a rotary shaft extending through said plate and said cage ring and arranged for relative rotation therewith; spring means rotatably mounted on said shaft and engaging said ball detent; and means securing said spring means against axial movement on said shaft; said spring means yieldingly maintaining said ball detent in engagement with said plate to hold said rotary shaft in a selected rotary position as determined by said ball detent and said detent positions on said plate.

2. An indexing mechanism as defined in claim 1 wherein said detent positions comprise radially spaced and coined holes.

3. An indexing mechanism as defined in claim 1 wherein said detent positions comprise radially spaced projections.

4. An indexing mechanism as defined in claim 1 wherein said detent plate is secured to said rotary shaft for rotation therewith and said cage ring is fixedly secured relative to said rotary shaft.

5. An indexing mechanism as defined in claim 1 wherein said detent plate is fixedly secured relative to said shaft and said cage ring is secured to said shaft for rotation therewith.

6. An indexing mechanism for positioning a rotary shaft in a selected position comprising: a detent plate secured for rotation with said shaft and having a plurality of radially spaced detent positions arranged in a ring around said shaft; cage means having at least one aperture therein fixedly secured relative to said shaft; ball detent means confined within said aperture in said cage means and received in said detent positions; spring means rotatably mounted on said shaft and engaging said ball detent means; and means securing said spring means against axial movement on said shaft; said spring means yieldingly pressing said ball detent means into engagement with said plate to hold said shaft in a selected rotary position as determined by said ball detent and said ring of detent positions.

7. An indexing mechanism for a rotary switch wherein a wiper is advanced in seriation over a plurality of radially spaced and circularly arranged contacts by means of a rotary shaft comprising: a detent plate secured for rotation with said shaft and having a circular cam track providing a plurality of radially spaced detent positions arranged in a ring around said shaft; cage means having at least one aperture therein fixedly secured relative to said shaft; ball detent means confined within an aperture in said cage means and received in said detent positions; spring means freely mounted on said shaft and engaging said ball detent means and means securing said spring means against axial movement of said shaft; said spring means rotation independently of said shaft for yieldingly pressing said ball detent means into engagement with said detent plate to hold said shaft in a selected rotary position as determined by said ball detent and said ring of detent positions.

8. An indexing mechanism comprising: a rotary shaft; a detent plate having a plurality of radially spaced detent projections formed thereon fixedly secured relative to said shaft, said shaft extending therethrough; a cage ring having at least one aperture therein fixedly secured to said shaft for rotation therewith and spaced from said detent plate; a ball detent received within said aperture and normally resting between adjacent detent projections; spring means rotatably mounted on said shaft and engaging said ball detent means and means securing said spring means against axial movement on said shaft; said spring means yieldingly maintaining said ball between adjacent detent projections, to hold said rotary shaft in a selected rotary position as determined by said ball and said detent projections.

9. An indexing mechanism for positioning a rotary shaft in a selected position comprising: a detent plate fixedly secured relative to said shaft and having a plurality of radially spaced detent projections arranged in a ring around said shaft; cage means having at least one aperture therein secured for rotation with said shaft; ball detent means confined within said aperture in said cage means and received between adjacent detent projections; spring means mounted on said shaft and engaging said ball detent means, and means securing said spring means against axial movement on said shaft; said spring means rotation independently of said shaft for yieldingly pressing said ball detent means between said detent projections and holding said shaft in a selected rotary position as determined by said ring of detent projections.

10. An indexing mechanism for a rotary switch wherein a first contact is advanced in seriation over a plurality of radially spaced and circularly arranged contacts by means of a rotary shaft comprising: a detent plate fixedly secured relative to said shaft and having a plurality of radially spaced detent projections arranged in a ring around said shaft; cage means having at least one aperture therein secured for rotation with said shaft; ball detent means confined within aperture in said cage means and received between adjacent detent projections; spring means freely mounted on said shaft and engaging said ball detent means; and means securing said spring means against axial movement on said shaft; said spring means rotation independently of said shaft for yieldingly pressing said ball detent means between said detent projections and holding said shaft in a selected rotary position as determined by said ring of detent projections.

References Cited
UNITED STATES PATENTS

| | | | |
|---|---|---|---|
| 2,770,982 | 11/1956 | Mastney et al. | 74—527 |
| 2,837,933 | 6/1958 | Patla | 74—527 |
| 3,096,665 | 7/1963 | Cappelle et al. | 74—527 |
| 3,127,786 | 4/1964 | Wooley | 74—527 |

FRED C. MATTERN, JR., *Primary Examiner.*

W. S. RATLIFF, *Assistant Examiner.*

UNITED STATES PATENT OFFICE
CERTIFICATE OF CORRECTION

Patent No. 3,336,816                           August 22, 1967

Peter Anthony Medicks et al.

It is hereby certified that error appears in the above numbered patent requiring correction and that the said Letters Patent should read as corrected below.

Column 6, line 68, beginning with "7. An indexing" strike out all to and including "detent positions." in line 10, column 7 and insert the following claim:

> 7. An indexing mechanism for a rotary switch wherein a wiper is advanced in seriation over a plurality of radially spaced and circularly arranged contacts by means of a rotary shaft comprising: a detent plate secured for rotation with said shaft and having a circular cam track providing a plurality of radially spaced detent positions arranged in a ring around said shaft; cage means having at least one aperture therein fixedly secured relative to said shaft; ball detent means confined within an aperture in said cage means and received in said detent positions; spring means freely mounted on said shaft for rotation independently of said shaft and engaging said ball detent means and means securing said spring means against axial movement on said shaft; said spring means yieldingly pressing said ball detent means into engagement with said detent plate to hold said shaft in a selected rotary position as determined by said ball detent and said ring of detent positions.

column 7, line 26, beginning with "9. An indexing" strike out all to and including "detent projections." in line 23, column 8 and insert instead the following claims:

> 9. An indexing mechanism for positioning a rotary shaft in a selected position comprising: a detent plate fixedly secured relative to said shaft and having a plurality of radially spaced detent projections arranged in a ring around said shaft; cage means having at least one aperture therein secured for rotation with said shaft; ball detent means confined within aperture in said cage means and received between adjacent detent projections; spring means mounted on said shaft for rotation independently of said shaft and engaging said ball detent means, and means securing said spring means against axial movement on said shaft; said spring means yieldingly pressing said ball detent means between said detent projections and holding said shaft in a selected rotary position as determined by said ring of detent projections.

10. An indexing mechanism for a rotary switch wherein a first contact is advanced in seriation over a plurality of radially spaced and circularly arranged contacts by means of a rotary shaft comprising: a detent plate fixedly secured relative to said shaft and having a plurality of radially spaced detent projections arranged in a ring around said shaft; cage means having at least one aperture therein secured for rotation with said shaft; ball detent means confined within aperture in said cage means and received between adjacent detent projections; spring means freely mounted on said shaft for rotation independently of said shaft and engaging said ball detent means; and means securing said spring means against axial movement on said shaft; said spring means yieldingly pressing said ball detent means between said detent projections and holding said shaft in a selected rotary position as determined by said ring of detent projections.

Signed and sealed this 29th day of October 1968.

(SEAL)
Attest:

EDWARD M. FLETCHER, JR.
Attesting Officer

EDWARD J. BRENNER
Commissioner of Patents